US012639689B2

(12) United States Patent
Margieh et al.

(10) Patent No.: US 12,639,689 B2
(45) Date of Patent: May 26, 2026

(54) SYSTEMS AND METHODS FOR MACHINE LEARNING INTEGRATION IN POINT-OF-SALE DEVICES

(71) Applicant: JPMORGAN CHASE BANK, N.A., New York, NY (US)

(72) Inventors: Sabreen Margieh, Spring Hill, FL (US); Rasanjaya Herath Mudiyanselage, Irving, TX (US); Justin Robinson, Tampa, FL (US); James A. Rogers, III, Land O' Lakes, FL (US); Marc Pendleton, Pinellas Park, FL (US); Harmeet Singh, McKinney, TX (US); Hasan Basri Ozturk, Tampa, FL (US); Amar Nath Jha, Tampa, FL (US); Bucci Douglas, Lithia, FL (US); Mizan Miah, Wilmington, DE (US); Sri Baskaran, McKinney, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 87 days.

(21) Appl. No.: 18/527,125

(22) Filed: Dec. 1, 2023

(65) Prior Publication Data
US 2025/0182082 A1 Jun. 5, 2025

(51) Int. Cl.
*G06Q 20/20* (2012.01)
*G06Q 20/32* (2012.01)
*G06Q 20/40* (2012.01)

(52) U.S. Cl.
CPC ......... *G06Q 20/204* (2013.01); *G06Q 20/322* (2013.01); *G06Q 20/401* (2013.01)

(58) Field of Classification Search
CPC ... G06Q 20/204; G06Q 20/322; G06Q 20/401
See application file for complete search history.

(56) References Cited

U.S. PATENT DOCUMENTS

| | | | |
|---|---|---|---|
| 2017/0345069 A1* | 11/2017 | Labrie ................ | G06Q 30/0283 |
| 2020/0242582 A1* | 7/2020 | Laserson ................... | G06T 7/13 |
| 2023/0008198 A1* | 1/2023 | Gadde .................. | G06V 30/412 |
| 2023/0162292 A1* | 5/2023 | Sundararaman ....... | G06Q 50/14 |
| | | | 382/103 |
| 2024/0412492 A1* | 12/2024 | Tu ...................... | G06V 30/1456 |

* cited by examiner

*Primary Examiner* — Raven E Yono
(74) *Attorney, Agent, or Firm* — GREENBERG TRAURIG LLP

(57) ABSTRACT

In some aspects, the techniques described herein relate to a method including: receiving, at a machine learning engine and as input to the machine learning engine, a digital image file, wherein the digital image file includes an image of a transaction receipt; outputting, by the machine learning engine, text from the digital image file that is recognized by the machine learning engine, wherein the text recognized by the machine learning engine includes a transaction identifier, a transaction amount, and a tip amount; populating, by a point-of-sale device, a transaction finalizing form with the transaction amount and the tip amount; receiving, at the point-of-sale device and via the transaction finalizing form, a command to finalize a transaction associated with the transaction identifier; and initiating, by the point-of-sale device, an update command, wherein the update command updates a record of a datastore associated with the transaction identifier with the tip amount.

20 Claims, 4 Drawing Sheets

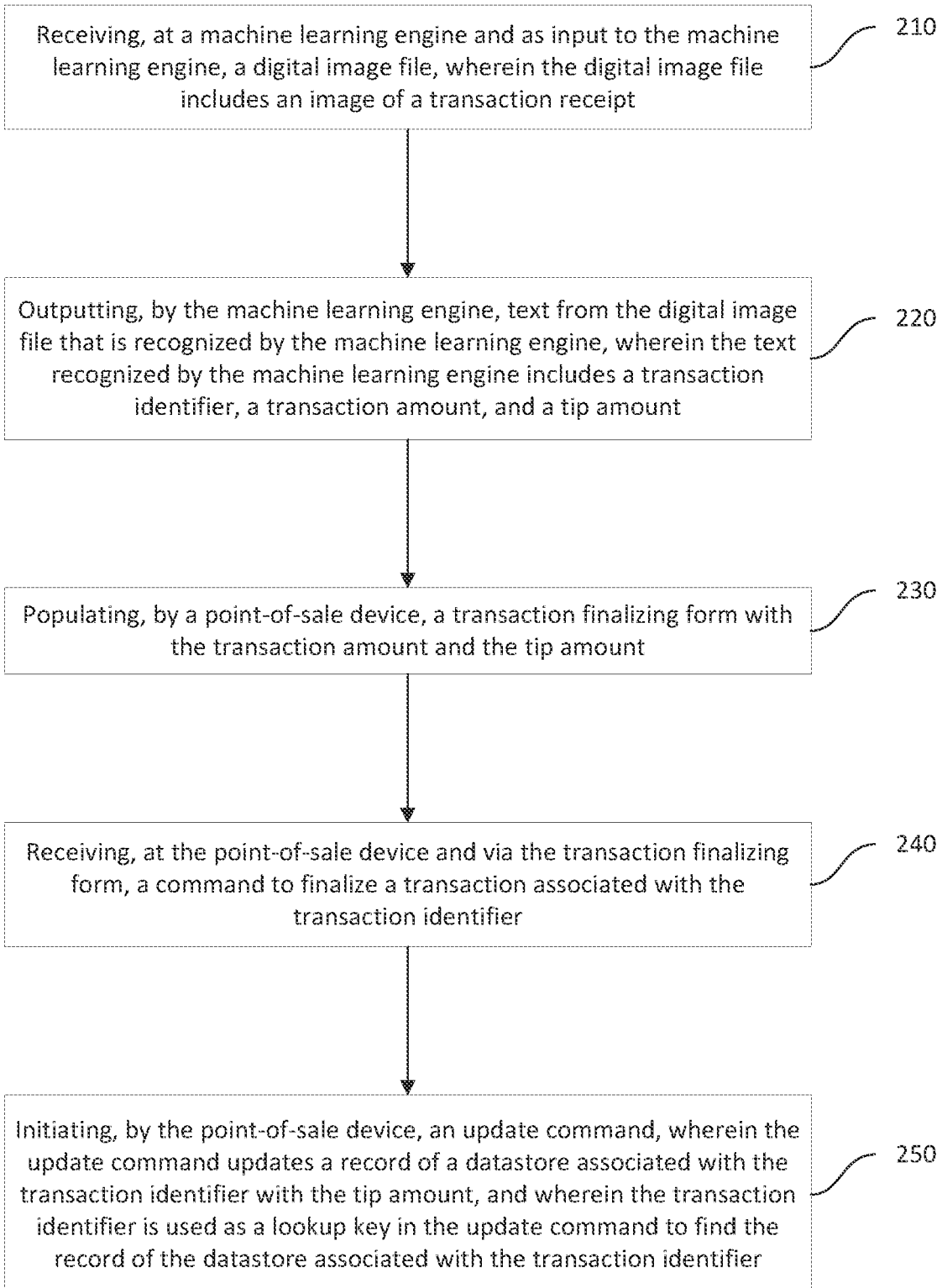

Receiving, at a machine learning engine and as input to the machine learning engine, a digital image file, wherein the digital image file includes an image of a transaction receipt — 210

Outputting, by the machine learning engine, text from the digital image file that is recognized by the machine learning engine, wherein the text recognized by the machine learning engine includes a transaction identifier, a transaction amount, and a tip amount — 220

Populating, by a point-of-sale device, a transaction finalizing form with the transaction amount and the tip amount — 230

Receiving, at the point-of-sale device and via the transaction finalizing form, a command to finalize a transaction associated with the transaction identifier — 240

Initiating, by the point-of-sale device, an update command, wherein the update command updates a record of a datastore associated with the transaction identifier with the tip amount, and wherein the transaction identifier is used as a lookup key in the update command to find the record of the datastore associated with the transaction identifier — 250

FIGURE 2

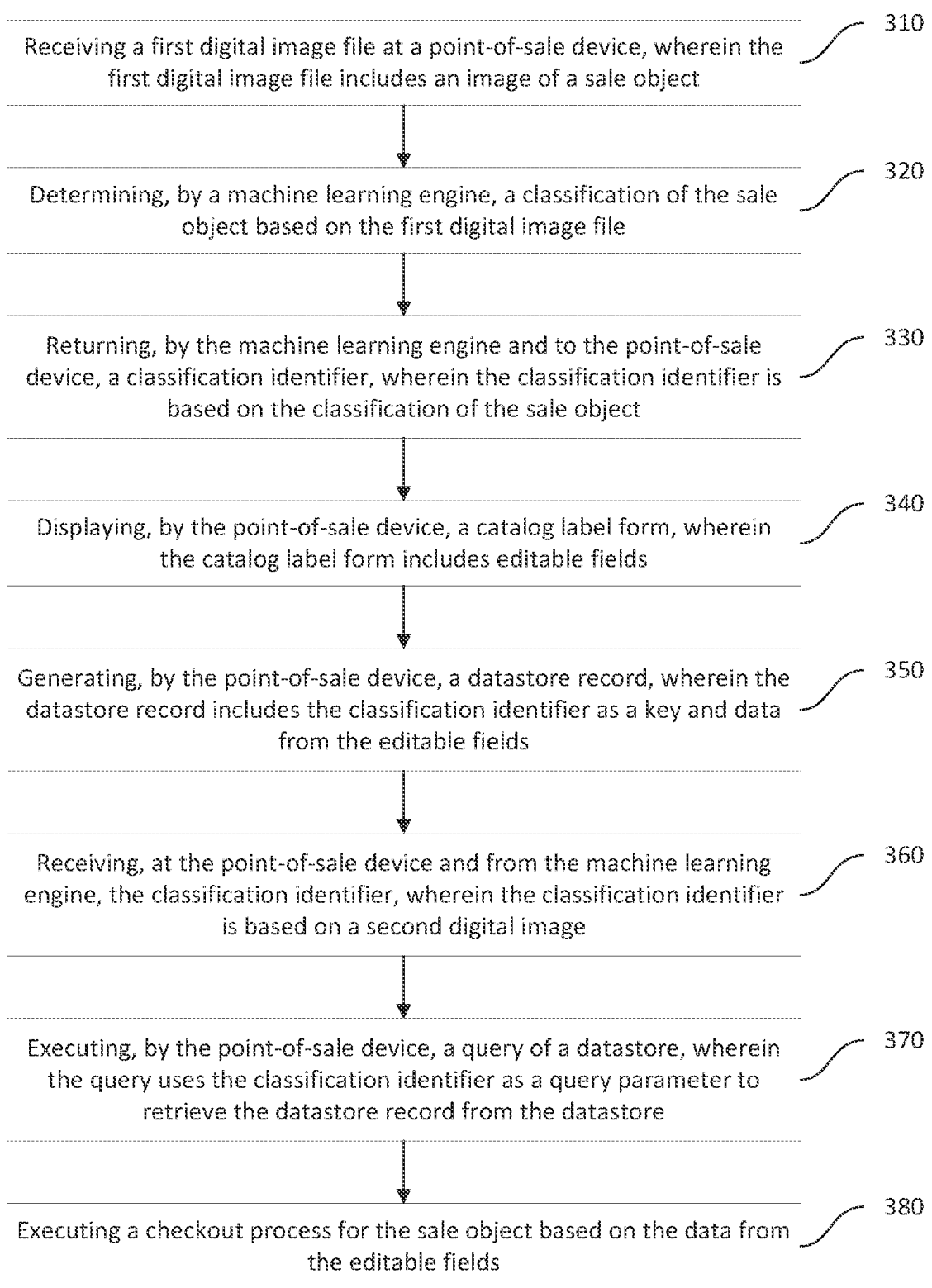

Receiving a first digital image file at a point-of-sale device, wherein the first digital image file includes an image of a sale object — 310

Determining, by a machine learning engine, a classification of the sale object based on the first digital image file — 320

Returning, by the machine learning engine and to the point-of-sale device, a classification identifier, wherein the classification identifier is based on the classification of the sale object — 330

Displaying, by the point-of-sale device, a catalog label form, wherein the catalog label form includes editable fields — 340

Generating, by the point-of-sale device, a datastore record, wherein the datastore record includes the classification identifier as a key and data from the editable fields — 350

Receiving, at the point-of-sale device and from the machine learning engine, the classification identifier, wherein the classification identifier is based on a second digital image — 360

Executing, by the point-of-sale device, a query of a datastore, wherein the query uses the classification identifier as a query parameter to retrieve the datastore record from the datastore — 370

Executing a checkout process for the sale object based on the data from the editable fields — 380

FIGURE 3

SYSTEMS AND METHODS FOR MACHINE LEARNING INTEGRATION IN POINT-OF-SALE DEVICES

BACKGROUND

1. Field of the Invention

Aspects generally relate to systems and methods for machine learning integration in point-of-sale (POS) devices.

2. Description of the Related Art

Conventional point-of-sale (POS) devices and systems rely heavily on manual user input in the processing and finalizing of a transaction. Moreover, users of a POS device/system, particularly small business users, may not have access to a conventional inventory system such as a barcoding system. This may lead to even more overhead in the form of additional manual data entry in order to maintain an accurate inventory. Automation in POS devices and systems may improve user experience while also lowering overhead costs for small businesses.

SUMMARY

In some aspects, the techniques described herein relate to a method including: receiving, at a machine learning engine and as input to the machine learning engine, a digital image file, wherein the digital image file includes an image of a transaction receipt; outputting, by the machine learning engine, text from the digital image file that is recognized by the machine learning engine, wherein the text recognized by the machine learning engine includes a transaction identifier, a transaction amount, and a tip amount; populating, by a point-of-sale device, a transaction finalizing form with the transaction amount and the tip amount; receiving, at the point-of-sale device and via the transaction finalizing form, a command to finalize a transaction associated with the transaction identifier; and initiating, by the point-of-sale device, an update command, wherein the update command updates a record of a datastore associated with the transaction identifier with the tip amount.

In some aspects, the techniques described herein relate to a method, wherein the transaction identifier is used as a lookup key in the update command to find the record of the datastore associated with the transaction identifier.

In some aspects, the techniques described herein relate to a method, wherein the update command updates the record of the datastore with a total amount of the transaction.

In some aspects, the techniques described herein relate to a method, wherein the total amount of the transaction is based on a sum of the tip amount and the transaction amount.

In some aspects, the techniques described herein relate to a method, wherein the point-of-sale device performs a verification, and wherein the verification determines whether a sum of the tip amount and the transaction amount are equal to a total amount recognized by the machine learning engine.

In some aspects, the techniques described herein relate to a method, wherein if the verification determines that the sum of the tip amount and the transaction amount are not equal to the total amount recognized by the machine learning engine, the point-of-sale device displays an alert to a user of the point-of-sale device.

In some aspects, the techniques described herein relate to a method, wherein the point-of-sale device is a multi-purpose mobile device.

In some aspects, the techniques described herein relate to an electronic device including a processor and a memory, wherein the electronic device is configured to: receive, at a machine learning engine and as input to the machine learning engine, a digital image file, wherein the digital image file includes an image of a transaction receipt; output, by the machine learning engine, text from the digital image file that is recognized by the machine learning engine, wherein the text recognized by the machine learning engine includes a transaction identifier, a transaction amount, and a tip amount; populate, at an interface of the electronic device, a transaction finalizing form with the transaction amount and the tip amount; receive, at the interface of the electronic device and via the transaction finalizing form, a command to finalize a transaction associated with the transaction identifier; and initiating, by the electronic device, an update command, wherein the update command updates a record of a datastore associated with the transaction identifier with the tip amount.

In some aspects, the techniques described herein relate to an electronic device, wherein the transaction identifier is used as a lookup key in the update command to find the record of the datastore associated with the transaction identifier.

In some aspects, the techniques described herein relate to an electronic device, wherein the update command updates the record of the datastore with a total amount of the transaction.

In some aspects, the techniques described herein relate to an electronic device, wherein the total amount of the transaction is based on a sum of the tip amount and the transaction amount.

In some aspects, the techniques described herein relate to an electronic device, wherein the electronic device performs a verification, and wherein the verification determines whether a sum of the tip amount and the transaction amount are equal to a total amount recognized by the machine learning engine.

In some aspects, the techniques described herein relate to an electronic device, wherein if the verification determines that the sum of the tip amount and the transaction amount are not equal to the total amount recognized by the machine learning engine, the electronic device displays an alert to a user of the electronic device.

In some aspects, the techniques described herein relate to an electronic device, wherein the electronic device is a multi-purpose mobile device.

In some aspects, the techniques described herein relate to a non-transitory computer readable storage medium, including instructions stored thereon, which instructions, when read and executed by one or more computer processors, cause the one or more computer processors to perform steps including: receiving, at a machine learning engine and as input to the machine learning engine, a digital image file, wherein the digital image file includes an image of a transaction receipt; outputting, by the machine learning engine, text from the digital image file that is recognized by the machine learning engine, wherein the text recognized by the machine learning engine includes a transaction identifier, a transaction amount, and a tip amount; populating, by a point-of-sale device, a transaction finalizing form with the transaction amount and the tip amount; receiving, at the point-of-sale device and via the transaction finalizing form, a command to finalize a transaction associated with the transaction identifier; and initiating, by the point-of-sale device, an update command, wherein the update command updates a record of a datastore associated with the transaction identifier with the tip amount.

In some aspects, the techniques described herein relate to a non-transitory computer readable storage medium, wherein the transaction identifier is used as a lookup key in the update command to find the record of the datastore associated with the transaction identifier.

In some aspects, the techniques described herein relate to a non-transitory computer readable storage medium, wherein the update command updates the record of the datastore with a total amount of the transaction.

In some aspects, the techniques described herein relate to a non-transitory computer readable storage medium, wherein the total amount of the transaction is based on a sum of the tip amount and the transaction amount.

In some aspects, the techniques described herein relate to a non-transitory computer readable storage medium, wherein the point-of-sale device performs a verification, and wherein the verification determines whether a sum of the tip amount and the transaction amount are equal to a total amount recognized by the machine learning engine.

In some aspects, the techniques described herein relate to a non-transitory computer readable storage medium, wherein if the verification determines that the sum of the tip amount and the transaction amount are not equal to the total amount recognized by the machine learning engine, the point-of-sale device displays an alert to a user of the point-of-sale device.

In some aspects, the techniques described herein relate to a method including: receiving a first digital image file at a point-of-sale device, wherein the first digital image file includes an image of a sale object; determining, by a machine learning engine, a classification of the sale object based on the first digital image file; returning, by the machine learning engine and to the point-of-sale device, a classification identifier, wherein the classification identifier is based on the classification of the sale object; displaying, by the point-of-sale device, a catalog label form, wherein the catalog label form includes editable fields; generating, by the point-of-sale device, a datastore record, wherein the datastore record includes the classification identifier as a key and data from the editable fields; receiving, at the point-of-sale device and from the machine learning engine, the classification identifier, wherein the classification identifier is based on a second digital image; executing, by the point-of-sale device, a query of a datastore, wherein the query uses the classification identifier as a query parameter to retrieve the datastore record from the datastore; and executing a checkout process for the sale object based on the data from the editable fields.

BRIEF DESCRIPTION OF THE DRAWINGS

FIG. 2 is a logical flow for machine learning integration in point-of-sale devices, in accordance with aspects.

FIG. 3 is a logical flow for machine learning integration in point-of-sale devices, in accordance with aspects.

DETAILED DESCRIPTION

Figure 1:
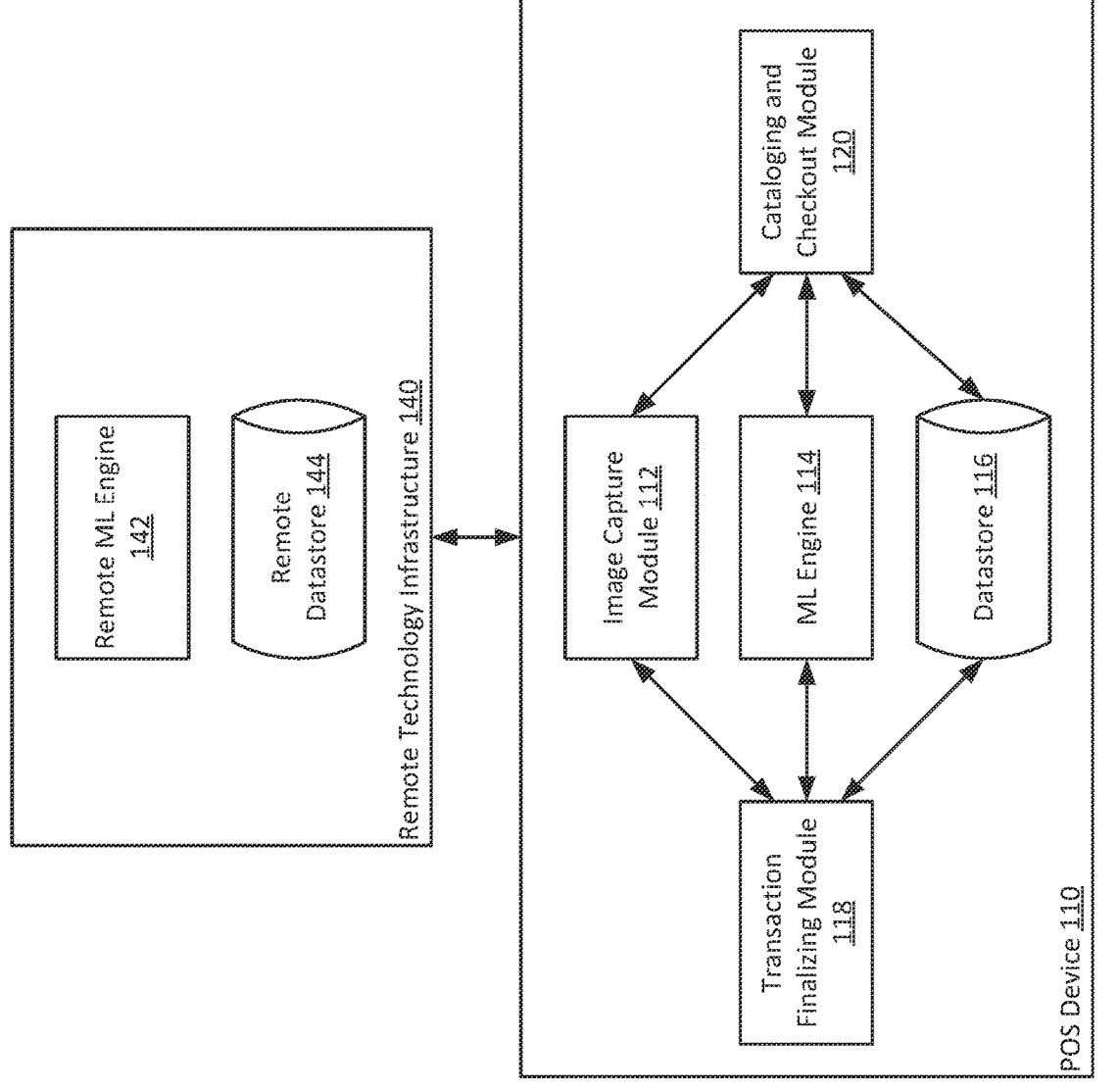
FIG. 1 is a system for machine learning integration in point-of-sale devices, in accordance with aspects.

Aspects generally relate to systems and methods for machine learning integration in point-of-sale (POS) devices.

In accordance with aspects, a POS device may be configured with a machine learning (ML) engine for evaluation of input data to the POS device. Input data may be provided via an image capture device (e.g., a digital camera) that is integrated into the POS device. Input data may also be provided via a datastore on the POS device. For instance, a datastore may store images captured by an image capture device integrated into a POS device. In accordance with aspects, a machine learning engine may be provided input data in the form of digital image data (i.e., a digital image or digital image file) either directly from an integrated capture device or via a user selection from a datastore of images. In some aspects, a POS device may have an image import function that allows images to be imported from an off-device datastore of images.

In accordance with aspects, an interface of a POS device (e.g., a graphical user interface) may allow a user of the POS device to capture an image using an image capture device integrated into the POS device. A captured image may be provided directly from the image capture device to a ML engine for evaluation or may be stored in a datastore and may be provided to a ML engine at some time after the image is captured.

In accordance with aspects, a ML engine may include an application programming interface (API). The API may publish API methods that may be called by other processes executing on the device. An API method may require one or more method parameters or arguments when it is invoked. For instance, an API method published by a ML engine may require digital image data (e.g., a digital image) as a parameter of a published method. An interface of a POS system may facilitate a user selection of a digital image to be provided as a parameter of an API method published by a ML engine executing on a POS device. Upon capture or selection of an image, a user may initiate an API method call that sends an image as a parameter of the API method to a ML engine for evaluation.

In accordance with aspects, a ML engine of a POS device may be configured to evaluate input data and generate output based on the input data one or more ML models executed by the ML engine. For example, a ML engine may include an optical character recognition (OCR) model that, given a digital image as input, may predict text characters captured in the digital image and provide the predicted or recognized characters as output. In other aspects, a ML engine may include an object recognition model that, given a digital image as input, outputs a prediction of an object captured in the image, and/or features of an object captured in the image. In some aspects, a POS device may have multiple ML engines each configured to provide different output based on an input (e.g., a ML engine dedicated to OCR, an ML engine dedicated to object recognition, etc.). In other aspects, a ML engine may execute more than one ML model and may be configured to generate more than one type of output.

A ML engine may be used as a component in different processes in a POS device. For instance, in order to improve efficiencies for a user of the POS device, a ML engine configured for OCR may be employed in a transaction finalizing process. Aspects of a POS device may provide a transaction finalizing process that extracts data from a digital image of a receipt of a transaction, finds a record associated with the transaction in a datastore of transactions based on data extracted from the transaction receipt, and adjusts the transaction amount to include a tip amount that a customer has hand-written onto the receipt. The transaction may then be saved to the datastore as a finalized transaction.

Conventionally, in order to update a transaction record a user of a POS must query a datastore by reading a transaction identifier from a transaction receipt and typing the transaction identifier into a query interface. A query of a transaction datastore is then performed and, if a matching transaction identifier is found in the queried transaction datastore, the transaction details are returned. Then, the user of the POS can edit the transaction by manually entering in a tip amount and performing an update action with respect to the transaction record in the transaction data store. Using an ML engine that is configured for OCR, however, this process can be made much more efficient for POS device/system users.

In accordance with aspects, a transaction finalizing process may provide an interface (e.g., a graphical user interface) that can be accessed via a hardware interface (e.g., a touch screen or other appropriate hardware interface) of a POS device. As used herein, a POS device may be a client device that is dedicated as a POS device or may be a client device (e.g., a mobile device) that is configured as described herein but that may also be used for other purposes. The interface may allow a user to capture or select a digital image of a transaction receipt. The interface may allow a user to parameterize a captured or selected transaction receipt as an API method of a ML engine that is configured to perform an OCR process on digital images. Once a user has provided a digital image file as a parameter (e.g., via interface interactions), the user may invoke the API method of the ML engine and pass the digital image data/file to the ML engine.

A ML engine may receive a digital image and may perform an OCR process on the digital image file. An OCR process may take a digital image file or digital image data as input and may provide a prediction of textual characters that are captured in the image as output. A ML engine may include a ML model that is trained to recognize text in an OCR process. Exemplary ML models that may be trained to recognize text may include Convolutional Neural Networks (CNNs), Recurrent Neural Networks (RNNs), Convolutional Recurrent Neural Networks (CRNNs), Long Short-Term Memory (LSTM) models, Transformer Models, Attention-Based Models, Encoder-Decoder Models, Connectionist Temporal Classification (CTC) Models, and hybrid models that combine multiple architectures to leverage the strengths of different approaches. For example, a combination of CNN and LSTM layers in a model can be used in a hybrid model for handwritten text recognition.

In accordance with aspects, ML models may be trained on one or more datasets to optimize character recognition in digital image files. In some aspects, pre-compiled datasets may be used to train models to recognize hand-written and/or computer generated text. In some aspects, pretrained models may be used in a ML engine, particularly where there is limited data with which to train ML models.

In accordance with aspects, a ML engine and associated model(s) may be hosted on a POS device, may be hosted on a remote technology infrastructure (e.g., a cloud-based environment) with which the POS device is in operative communication, or may leverage both on-device and off-device ML engines and models. In aspects where a remote-hosted ML engine is utilized, API methods may be used in a similar manner as described herein, but may traverse a network connection (e.g., an internet connection) rather than just on-device buses for parameterized data to be provided to the ML engine. On-device ML model processing has the advantage of working in an offline environment (i.e., an environment where a network connection with a remote infrastructure cannot be maintained). Model robustness in an offline-only environment, however, may be limited due to processing limitations of the POS device, itself. On the other hand, remote infrastructure-based model processing requires a computer network connection to the remote infrastructure but may be able to leverage more robust models due to the ability to scale the remote hardware that executes the models.

In some aspects, an ML engine may include an orientation detection step that may detect the orientation of text in a digital image input. This may improve ML engine output by orienting a received digital image in an orientation favorable for text recognition operations, particularly if many images used for input will be in a rotated orientation when provided to a ML engine. In some aspects, a ML engine implementation may include a text block and line detection process. A text block and line detection implementation may enhance an OCR process by recognizing areas in a digital image that correspond to structured data categorizations. For instance, text determined to be in an area enclosed with lines where the area is located in a particular region (e.g., upper left, upper middle) of an image may be determined to be a particular type of data. In an exemplary aspect, text found in an upper-middle portion (or any other pre-defined portion) of a transaction receipt may be recognized as a transaction identifier, a transaction amount, a transaction tip, etc.

In some aspects, a ML engine may implement a text recognition confidence threshold. Such an implementation may be configured to generate a confidence score based on output predictions of text in an input image. The confidence score may be used to filter out low-confidence text predictions thereby improving an overall accuracy of the predictions of an OCR process of a ML engine. In some aspects, a threshold level may be configurable. A threshold level may be raised or lowered to manipulate what confidence scores are required for a text prediction to the displayed to a user (e.g., via an interface).

In aspects where a remote ML engine is invoked, error handling and retry logic may be included in an API interface to handle network failures or poor network connections. For instance, if an error or failure is detected due to data loss or high network latency when making API method calls and sending parameterized data across a network connection, then processes may be configured to retry the method call including re-sending parameter data across the network connection without additional user input. A retry process may retry method calls a fixed number of time, may retry method calls for a defined amount of time, may retry method calls after a timeout period (e.g., a set number of milliseconds), etc.

In some ML engine implementations, a model may be trained to detect a language that recognized text is written in, thereby facilitating text extraction in multiple languages.

In accordance with aspects, a preprocessing module may be included on a POS device. A preprocessing module may enhance a digital image prior to the image being processed with a ML model. Preprocessing may include steps such as resizing, denoising, or binarization to enhance image quality.

In accordance with aspects, an ML engine may be trained to recognize particular information that is printed on a transaction receipt. For instance, a ML engine that executes an OCR process/model may be trained to extract a transaction identifier and a hand-written tip amount. An OCR model may be trained to determine a particular format and length of a transaction identifier (e.g., an alpha-numeric string that is n characters long. Moreover, an OCR model may be trained to recognize a text block that includes the terms "Tip:" and "Total:" and to determine hand-written text to the left of the terms. Moreover, an OCR engine may be configured to determine an "Amount:" term and a transaction amount to the left of the "amount:" term. In other aspects, an "amount" value may be retrieved from a transaction datastore. An amount term may be an original or base amount of a transaction before a tip is added to the transaction.

In this case, the ML engine may employ a mathematical checking or verification procedure based on the information that the OCR model determined. For instance, a OCR model may predict an amount value to be, e.g., $10.00. The OCR model may further detect a tip amount to be, e.g., $2.00, and a total amount value to be $12.00. A mathematical check may be performed that adds the amount value and the tip value and then compares the sum of the amount value and the tip value to the total value. If the sum value and the total value are equal, then the mathematical check procedure is passed, and the values may be populated for user review, persisting to a transaction database, etc. If, however, the values do not match, then an alert may be presented to the user to make the user aware of the detected discrepancy. Such an alert may give a user of the POS device cause to manually inspect a transaction receipt in and manually update data before a transaction is finalized (e.g., updated and saved to a transaction database).

In accordance with aspects, a transaction finalizing process may take predicted text output from a ML engine and may populate a digital form displayed in a user interface with the predicted text. For instance, a transaction finalizing process may populate a transaction finalizing form with a transaction amount, a tip amount, and a total amount. The form may be displayed to a user and may accept user input. A user may provide various forms of input. For instance, a user may adjust, e.g., a tip amount in the case where an OCR model of a ML engine has not accurately recognized a tip amount. Moreover, a user may confirm the tip amount and the total amount.

When a user confirms a tip amount and a total amount, a transaction finalizing process may format a query of a transaction datastore using the displayed information. For instance, a transaction finalizing process may format an update query using a determined transaction identifier as a lookup key for finding a corresponding record in a transaction datastore. The transaction finalizing process may update a tip field and a total field of a datastore record associated with the transaction identifier and may save the record. Once the record is saved, the transaction may be considered finalized, since any hand-written tip and an accurate total amount (i.e., an original transaction amount plus a tip amount) have been used to update a corresponding transaction record. A transaction finalizing process may display an alert to a user via an interface that alerts the user to the corresponding transaction being finalized.

In accordance with aspects, a ML engine may also be used in a cataloging process. A cataloging process involving digital images may be used where a conventional inventory management scheme (e.g., a barcoding or other inventory management scheme for identifying inventoried products) is not available. Inventory may be managed through the use of digital images and a ML engine. A cataloging process may be used to catalog (i.e., inventory) items and to identify items at checkout.

In accordance with aspects, a cataloging process may execute on a POS device and may use an image capture device (e.g., integrated into the POS device) to capture images of objects that will be added to a catalog/inventory.

In some aspects, stored images may be used in addition to or in place of captured images. A cataloging process may provide an interface, such as a graphical user interface, where a user of a POS device may interact with the cataloging process. Through an interface, a user may be able to capture or select an image of an object.

Once an image is selected or captured, a cataloging process may be configured to display a catalog label for the item. A catalog label may be configured as a digital form that is displayed via an interface of a POS device. The catalog label may include one or more fields (e.g., text fields, drop-down boxes, or other editable fields that may be displayed via, e.g., a form of a graphical user interface) where a user can change or otherwise manipulate data with respect to the object to be added to the catalog. An exemplary field may be a "name" field. A user can provide a name for the object by typing/selecting a name in the "name" field. Another exemplary field may be a "price" field. A user may set a price for the object by updating the "price" field with a numerical or string value. Other exemplary fields may include a "description" field, a "category" field, and so on.

Fields in a catalog label form may be mapped to a catalog datastore. When a user has captured or selected an image and input appropriate data into the catalog label form, the user may save the form data to a catalog datastore (e.g., via a "save" button in the interface). A "save" instruction may execute a create operation with respect to the catalog database. The digital image of the object and the data entered into each field of the catalog label form may be persisted to a record of the catalog datastore. Additionally, a digital image or a representation thereof may be stored with a relationship to the corresponding catalog record of the object. The digital image (or the representation thereof) may be stored as a lookup key (e.g., a primary key) of the object's catalog record. In an exemplary aspect, a image may be converted into a numerical representation of the image, such as a vector embedding of the image. A ML engine may convert the image into a vector embedding for storage and for later comparisons to other received images.

In accordance with aspects, a ML engine may categorize a sale object captured in a digital image based on characteristics of the sale object that are recognized by the ML engine. For instance, a sale object may be categorized as "sunglasses" if an image processed by the machine learning engine is of a pair of sunglasses. Moreover, a sale object may be categorized as "stapler" if an image processed by a ML engine includes a image of a stapler. Sale object classifications may be associated with class identifiers and a class identifier may be stored with other sale object data in a datastore record associated with the sale object. A class identifier may be stored as a lookup key in a datastore record and the record may be retrieved using the class identifier as a lookup key in a query of the datastore. In some aspects, a ML engine may classify a sales object at a lower level of granularity. That is, an ML engine may be trained to recognize different brands and/or models of sale objects, and each brand/model of sale object may have an associated class identifier.

In accordance with aspects, a checkout process may utilize a catalog datastore and a ML engine in order to complete a sale transaction of one or more objects that have been cataloged with a catalog process. A POS device executing a checkout process may prompt a user for an image of a sale object. A user may "scan" the sale object by capturing a picture of the sale object, e.g., with an image capture device integrated into the POS device. A captured image of a sale object may be passed to a ML engine as input to the ML engine. The image may be passed, e.g., as a parameter of an API method, as discussed in more detail, herein.

A ML engine may be configured with a ML model that is configured and trained to recognize an object in a received image and output a type of object or an object classification that is recognized by the ML model. For instance, if the sale image is of a pair of sunglasses, then the ML engine may recognize the sale image as sunglasses and may output a class identifier that is associated with a "sunglasses" class. In another example, if the sale image is of a stapler, then the ML image may recognize the sale object as a stapler and may output a class identifier that is associated with a "stapler" class. Model output may be more granular. For instance, a model may be trained to predict a particular brand of sale object or may be trained to determine among different models or instances of a sale object.

In accordance with aspects, output from a ML engine may be used as a lookup key in a query of a catalog database to retrieve persisted data that is related to the scanned item. For instance, an ML engine may output a class identifier (or, in some aspects, a more granular identifier of a sale object, such as an identifier that is associated with a particular brand or model of a sale object). A checkout process may then use the output class identifier as a lookup key to retrieve data associated with the class identifier from the datastore using the lookup key in a query of the datastore. Data from a retrieved datastore record associated with a sale object may then be used to complete a checkout process. For instance, data in a price field and a name field may be added as a line item to a sales invoice/receipt and a total may be summed from each sale object added to the invoice.

FIG. 1 is a system for machine learning integration in point-of-sale devices, in accordance with aspects. System 100 includes point-of-sale (POS) device 110. POS device 110 includes image capture module 112, machine learning (ML) engine 114 and datastore 116. POS device 110 also includes transaction finalizing module 118 and cataloging and checkout module 120. System 100 also includes remote technology infrastructure 140, which includes remote ML engine 142 and remote datastore 144.

In accordance with aspects, POS device 110 may be configured as a dedicated POS device or may be a multi-purpose client device (e.g., such as a mobile device) that is configured as a POS device described herein. Image capture module may receive digitally captured images from an image capture device (e.g., a digital camera—not shown in FIG. 1) and format the digitally captured images, e.g., as a digital image file. Datastore 116 may be any suitable datastore. For example, datastore 116 may be configured as a relational database, a key-value pair datastore, a data lake, etc. Datastore 116 may store digital image data, such as digital image files, as discussed herein. Datastore 116 may also be configured as a transaction datastore, a catalog datastore, etc. In some aspects, POS device 110 may be configured with multiple datastores. In some aspects, remote datastore 144 (which may be any suitable datastore and may be appropriately configured, as discussed herein) may be used by POS device 110 for storage of data described herein.

ML engine 114 may include and be configured to execute one or more ML models, as discussed herein. In some aspects, POS device 110 may include multiple ML engines. ML engine 114 may receive digital image data/files from transaction finalizing module 118 and cataloging and checkout module 120 as input data. ML engine 114 may receive input data via an API interface provided by ML engine 114. An API interface of ML engine 114 may publish API methods that may be called by, e.g., transaction finalizing module 118 and/or cataloging and checkout module 120. Published API methods may require a method parameter or argument, and the parameter may be a digital image (e.g., in the form of a digital image file).

In accordance with aspects, transaction finalizing module 118 or cataloging and checkout module 120 may prompt a user, via a user interface, for a digital image. A user may capture a digital image or retrieve one from an accessible datastore (e.g., datastore 116 or remote datastore 144). Transaction finalizing module 118 or cataloging and checkout module 120 may pass a received digital image to ML engine 114 as, e.g., a parameter of a called API method.

In accordance with aspects, with respect to an image received from transaction finalizing module 118, ML engine 114 may process the received image with a ML model that is configured to recognize text characters in the image (e.g., an OCR model). ML engine 114 may output recognized text to ML engine 114. In some aspects, recognized text may be labeled, e.g., as a transaction amount, a tip amount, and/or a total amount (as discussed in more detail herein). Text output by ML engine 114 may be included in fields of a transaction finalizing form and presented to a user of POS device 110. In some aspects, transaction finalizing module 118 may perform mathematical verification of the text numbers as described herein. Transaction finalizing module 118 may convert string text into integers, floats, doubles, or some other datatype needed to perform mathematical verification if necessary.

A user may verify the text displayed in the transaction finalizing form and may confirm that the displayed text is accurate by, e.g., finalizing the transaction, where finalizing the transaction initiates an update procedure to a transaction data store. An update procedure may update a record that is associated with a transaction identifier recognized by ML engine 114. That is, transaction finalizing module 118 may use a transaction identifier recognized from a digital image of a transaction receipt as a lookup key in a query of datastore 116 and may write other textual data recognized by ML engine 114 to the data record related to the transaction record identified by the recognized transaction identifier. Transaction finalizing module 118 may update a "tip" field of a corresponding data record to a "tip" value recognized by ML engine 114, and may update a "transaction total" field of a corresponding data record to a "total" value recognized by ML engine 114.

In accordance with aspects, cataloging and checkout module 120 may also prompt a user for a digital image of an object. Upon capture or selection of a digital image including a sale object, cataloging and checkout module 120 may display a catalog label form via a user interface. A catalog label form may include fields such as "name" "price," "description," etc. A user may update the catalog label form and may save the label form data to a datastore in a record associated with the sale object (e.g., datastore 116 or remote datastore 144). The received digital image of the sale object may also be stored with a relation to the record associated with the sale object. The digital image of the sale object, or a numerical representation thereof, may be stored with a relationship to the record and may be configured as a lookup key (e.g., a primary key) for the associated record.

In accordance with aspects, cataloging and checkout module 120, in a checkout process, may prompt a user to "scan" a sale object. Scanning a sale object may include capturing an image of the sale object that is being sold (i.e., transacted) at POS device 110. A user of POS device 110 may capture a digital image of the sale object using an image capture device of POS device 110 and cataloging and checkout module 120 may receive the image and pass the image to ML engine 114 as a parameter of an API method. ML engine 114 may receive the image and process the image with an image recognition model. ML engine 114 may output a prediction of the image model in the form of a classification of the model. The classification output by ML engine 114 may be a textual or numerical representation of the sale object captured in the received digital image. For instance, the received digital image may classify the object in the image and ML engine 114 may return a classification identifier to cataloging and checkout module 120.

In accordance with aspects, cataloging and checkout module 120 may use the classification identifier as a lookup key to retrieve catalog data from, e.g., datastore 116 and populate a checkout form. An exemplary checkout form may include a price field, a name field, a description field, etc. A user of POS device 110 may interact with the checkout form to add the sale object to a list of sale objects. Cataloging and checkout module 120 may perform additional steps such as calculating a total for all sale objects scanned by POS device 110, generating a receipt for all sale objects scanned POS device 110, initiating a payment method when an indication is received that all sale objects have been scanned, and other steps necessary or desirable to complete a checkout process for a transaction.

In some aspects, storage and ML engine steps noted herein may be carried out by remote datastore 144 and remote ML engine 142 (respectively). In these aspects, POS device 110 may be in operative communication with remote technology infrastructure 140 via a computer network. The computer network may be private or public (such as the internet). API method calls, and data reads, writes, updates, etc., may be directed across the computer network to remote technology infrastructure 140.

FIG. 2 is a logical flow for machine learning integration in point-of-sale devices, in accordance with aspects.

Step 210 includes receiving, at a machine learning engine and as input to the machine learning engine, a digital image file, wherein the digital image file includes an image of a transaction receipt.

Step 220 includes outputting, by the machine learning engine, text from the digital image file that is recognized by the machine learning engine, wherein the text recognized by the machine learning engine includes a transaction identifier, a transaction amount, and a tip amount.

Step 230 includes populating, by a point-of-sale device, a transaction finalizing form with the transaction amount and the tip amount.

Step 240 includes receiving, at the point-of-sale device and via the transaction finalizing form, a command to finalize a transaction associated with the transaction identifier.

Step 250 includes initiating, by the point-of-sale device, an update command, wherein the update command updates a record of a datastore associated with the transaction identifier with the tip amount, and wherein the transaction identifier is used as a lookup key in the update command to find the record of the datastore associated with the transaction identifier.

FIG. 3 is a logical flow for machine learning integration in point-of-sale devices, in accordance with aspects.

Step 310 includes receiving a first digital image file at a point-of-sale device, wherein the first digital image file includes an image of a sale object.

Step 320 includes determining, by a machine learning engine, a classification of the sale object based on the first digital image file.

Step 330 includes returning, by the machine learning engine and to the point-of-sale device, a classification identifier, wherein the classification identifier is based on the classification of the sale object.

Step 340 includes displaying, by the point-of-sale device, a catalog label form, wherein the catalog label form includes editable fields.

Step 350 includes generating, by the point-of-sale device, a datastore record, wherein the datastore record includes the classification identifier as a key and data from the editable fields.

Step 360 includes receiving, at the point-of-sale device and from the machine learning engine, the classification identifier, wherein the classification identifier is based on a second digital image.

Step 370 includes executing, by the point-of-sale device, a query of a datastore, wherein the query uses the classification identifier as a query parameter to retrieve the datastore record from the datastore.

Step 380 includes executing a checkout process for the sale object based on the data from the editable fields.

Figure 4:
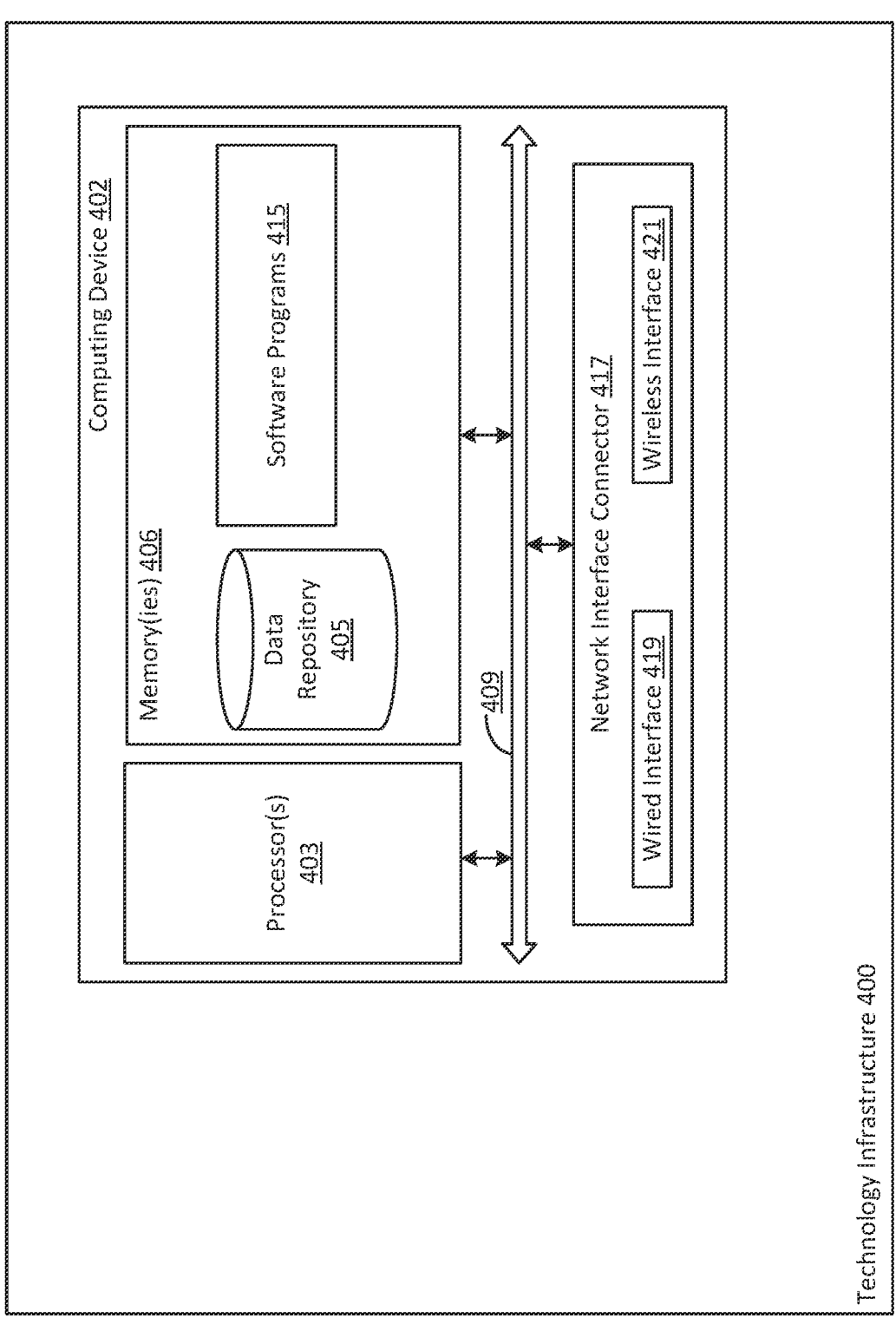
FIG. 4 is a block diagram of a technology infrastructure and computing device for implementing certain aspects of the present disclosure, in accordance with aspects.

FIG. 4 is a block diagram of a technology infrastructure and computing device for implementing certain aspects of the present disclosure, in accordance with aspects. FIG. 4 includes technology infrastructure 400. Technology infrastructure 400 represents the technology infrastructure of an implementing organization. Technology infrastructure 400 may include hardware such as servers, client devices, and other computers or processing devices. Technology infrastructure 400 may include software (e.g., computer) applications that execute on computers and other processing devices. Technology infrastructure 400 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 400 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 400 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 400 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper of fiber optic wire/cable) that forms a physical computer network. Routers, switches, and firewalls may also have "wireless" interfaces that facilitate data transmissions via radio waves. A computer network included in technology infrastructure 400 may include both wired and wireless components and interfaces and may interface with servers and other hardware via either wired or wireless communications. A computer network of technology infrastructure 400 may be a private network but may interface with a public network (such as the internet) to facilitate operative communication between computers executing on technology infrastructure 400 and computers executing outside of technology infrastructure 400.

FIG. 4 further depicts exemplary computing device 402. Computing device 402 depicts exemplary hardware that executes the logic that drives the various system components described herein. Servers and client devices may take the form of computing device 402. While shown as internal to technology infrastructure 400, computing device 402 may be external to technology infrastructure 400 and may be in operative communication with a computing device internal to technology infrastructure 400.

In accordance with aspects, system components such as a POS device, a ML engine, an image capture module, a transaction finalizing module a cataloging and checkout module, client devices, servers, various database engines and database services, and other computer applications and logic may include, and/or execute on, components and configurations the same, or similar to, computing device 402.

Computing device 402 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 402 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user.

Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

receiving, at a machine learning engine and as input to the machine learning engine, a digital image file, wherein the digital image file includes an image of a transaction receipt;

preprocessing, by the machine learning engine, the digital image file to enhance image quality for optical character recognition, wherein preprocessing includes at least one of resizing, denoising, or binarization;

detecting, by the machine learning engine, an orientation of a text in the digital image file and correcting the orientation prior to text recognition;

determining, by the machine learning engine, a type of the text based on the text being in an area enclosed with lines where the area is located in a region of an image of the digital image file;

outputting, by the machine learning engine, a recognized text from the digital image file that is recognized by the machine learning engine, wherein the recognized text includes a transaction identifier, a transaction amount, and a tip amount;

populating, by a point-of-sale device, a transaction finalizing form with the transaction amount and the tip amount;

receiving, at the point-of-sale device and via the transaction finalizing form, a command to finalize a transaction associated with the transaction identifier;

initiating, by the point-of-sale device, an update command, wherein the update command updates a record of a datastore associated with the transaction identifier with the tip amount;

predicting, by an optical character recognition model included in the machine learning engine, text characters captured from the digital image file;

generating, by the machine learning engine, a confidence score based on output predictions of the text in an input image;

configuring, by the machine learning engine and the point-of-sale device, a confidence threshold for the confidence score to filter out low-confidence text predictions; and implementing, by the machine learning engine, the threshold value such that the confidence threshold is raised or lowered to optimize the text character predicting, wherein the machine learning engine is trained to extract a transaction identifier with a predefined format and a predefined length and a hand-written text.

2. The method of claim 1, wherein the transaction identifier is used as a lookup key in the update command to find the record of the datastore associated with the transaction identifier.

3. The method of claim 1, wherein the update command updates the record of the datastore with a total amount of the transaction.

4. The method of claim 3, wherein the total amount of the transaction is based on a sum of the tip amount and the transaction amount.

5. The method of claim 1, wherein the point-of-sale device performs a verification, and wherein the verification determines whether a sum of the tip amount and the transaction amount are equal to a total amount recognized by the machine learning engine.

6. The method of claim 5, wherein if the verification determines that the sum of the tip amount and the transaction amount are not equal to the total amount recognized by the machine learning engine, the point-of-sale device displays an alert to a user of the point-of-sale device.

7. The method of claim 1, wherein the point-of-sale device is a multi-purpose mobile device.

8. An electronic device including a processor and a memory, wherein the electronic device is configured to:

receive, at a machine learning engine and as input to the machine learning engine, a digital image file, wherein the digital image file includes an image of a transaction receipt;

preprocess, by the machine learning engine, the digital image file to enhance image quality for optical character recognition, wherein preprocessing includes at least one of resizing, denoising, or binarization;

detect, by the machine learning engine, an orientation of a text in the digital image file and correcting the orientation prior to text recognition;

determine, by the machine learning engine, a type of the text based on the text being in an area enclosed with lines where the area is located in a region of an image of the digital image file;

output, by the machine learning engine, a recognized text from the digital image file that is recognized by the machine learning engine, wherein the recognized text includes a transaction identifier, a transaction amount, and a tip amount;

populate, at an interface of the electronic device, a transaction finalizing form with the transaction amount and the tip amount;

receive, at the interface of the electronic device and via the transaction finalizing form, a command to finalize a transaction associated with the transaction identifier;

initiate, by the electronic device, an update command, wherein the update command updates a record of a datastore associated with the transaction identifier with the tip amount;

predict, by an optical character recognition model included in the machine learning engine, text characters captured from the digital image file;

generate, by the machine learning engine, a confidence score based on output predictions of the text in an input image;

configure, by the machine learning engine and the point-of-sale device, a confidence threshold for the confidence score to filter out low-confidence text predictions; and implement, by the machine learning engine, the threshold value such that the confidence threshold is raised or lowered to optimize the text character prediction, wherein the machine learning engine is trained to extract a transaction identifier with a predefined format and a predefined length and a hand-written text.

9. The electronic device of claim 8, wherein the transaction identifier is used as a lookup key in the update command to find the record of the datastore associated with the transaction identifier.

10. The electronic device of claim 8, wherein the update command updates the record of the datastore with a total amount of the transaction.

11. The electronic device of claim 10, wherein the total amount of the transaction is based on a sum of the tip amount and the transaction amount.

12. The electronic device of claim 8, wherein the electronic device performs a verification, and wherein the verification determines whether a sum of the tip amount and the transaction amount are equal to a total amount recognized by the machine learning engine.

13. The electronic device of claim 12, wherein if the verification determines that the sum of the tip amount and the transaction amount are not equal to the total amount recognized by the machine learning engine, the electronic device displays an alert to a user of the electronic device.

14. The electronic device of claim 8, wherein the electronic device is a multi-purpose mobile device.

15. A non-transitory computer readable storage medium, including instructions stored thereon, which instructions, when read and executed by one or more computer processors, cause the one or more computer processors to perform steps comprising:

receiving, at a machine learning engine and as input to the machine learning engine, a digital image file, wherein the digital image file includes an image of a transaction receipt;

preprocessing, by the machine learning engine, the digital image file to enhance image quality for optical character recognition, wherein preprocessing includes at least one of resizing, denoising, or binarization;

detecting, by the machine learning engine, an orientation of a text in the digital image file and correcting the orientation prior to text recognition;

determining, by the machine learning engine, a type of the text based on the text being in an area enclosed with lines where the area is located in a region of an image of the digital image file;

outputting, by the machine learning engine, a recognized text from the digital image file that is recognized by the machine learning engine, wherein the recognized text includes a transaction identifier, a transaction amount, and a tip amount;

populating, by a point-of-sale device, a transaction finalizing form with the transaction amount and the tip amount;

receiving, at the point-of-sale device and via the transaction finalizing form, a command to finalize a transaction associated with the transaction identifier; and initiating, by the point-of-sale device, an update command, wherein the update command updates a record of a datastore associated with the transaction identifier with the tip amount;

predicting, by an optical character recognition model included in the machine learning engine, text characters captured from the digital image file;

generating, by the machine learning engine, a confidence score based on output predictions of the text in an input image;

configuring, by the machine learning engine and the point-of-sale device, a confidence threshold for the confidence score to filter out low-confidence text predictions; and implementing, by the machine learning engine, the threshold value such that the confidence threshold is raised or lowered to optimize the text character predicting, wherein the machine learning engine is trained to extract a transaction identifier with a predefined format and a predefined length and a hand-written text.

16. The non-transitory computer readable storage medium of claim 15, wherein the transaction identifier is used as a lookup key in the update command to find the record of the datastore associated with the transaction identifier.

17. The non-transitory computer readable storage medium of claim 15, wherein the update command updates the record of the datastore with a total amount of the transaction.

18. The non-transitory computer readable storage medium of claim 17, wherein the total amount of the transaction is based on a sum of the tip amount and the transaction amount.

19. The non-transitory computer readable storage medium of claim 15, wherein the point-of-sale device performs a verification, and wherein the verification determines whether a sum of the tip amount and the transaction amount are equal to a total amount recognized by the machine learning engine.

20. The non-transitory computer readable storage medium of claim 19, wherein if the verification determines that the sum of the tip amount and the transaction amount are not equal to the total amount recognized by the machine learning engine, the point-of-sale device displays an alert to a user of the point-of-sale device.

\* \* \* \* \*